(12) United States Patent
Fattal et al.

(10) Patent No.: US 7,907,811 B2
(45) Date of Patent: Mar. 15, 2011

(54) OPTICAL WAVEGUIDES AND METHODS OF MAKING THE SAME

(75) Inventors: David Fattal, Mountain View, CA (US); Marco Florentino, Mountain View, CA (US); Qianfan Xu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 175 days.

(21) Appl. No.: 12/263,400

(22) Filed: Oct. 31, 2008

(65) Prior Publication Data

US 2009/0279838 A1 Nov. 12, 2009

Related U.S. Application Data

(60) Provisional application No. 61/050,682, filed on May 6, 2008.

(51) Int. Cl.
*G02B 6/10* (2006.01)
*B29D 11/00* (2006.01)

(52) U.S. Cl. .......................................... 385/146; 216/24

(58) Field of Classification Search .................. 385/146; 216/24

See application file for complete search history.

(56) References Cited

U.S. PATENT DOCUMENTS

| | | | |
|---|---|---|---|
| 5,274,720 A | 12/1993 | Yamamoto | |
| 6,602,432 B2 | 8/2003 | Matsuyama | |
| 6,795,635 B1 * | 9/2004 | Fajardo et al. | 385/140 |
| 7,097,778 B2 * | 8/2006 | Ho et al. | 216/26 |
| 7,174,080 B2 * | 2/2007 | Walker | 385/131 |
| 7,528,403 B1 * | 5/2009 | Borselli et al. | 257/25 |
| 2005/0070113 A1 | 3/2005 | Hanberg | |
| 2008/0019408 A1 * | 1/2008 | Behfar | 372/43.01 |

OTHER PUBLICATIONS

Hewlett-Packard, PCT/US2009/042172 (co-pending application), Internat'l Search Report, issued by KIPO as Internat'l Searching Authority, Nov. 30, 2009.

* cited by examiner

*Primary Examiner* — Ryan Lepisto
*Assistant Examiner* — Eric Wong

(57) ABSTRACT

An optical waveguide includes a silicon wafer having two opposed sides. A first notch is defined in each of the two opposed sides such that the silicon wafer includes a head portion and a first stem portion.

17 Claims, 2 Drawing Sheets

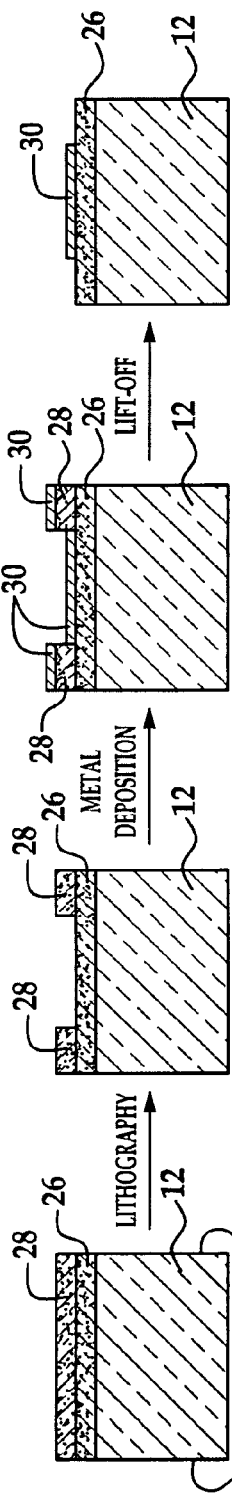

OPTICAL WAVEGUIDES AND METHODS OF MAKING THE SAME

CROSS-REFERENCE TO RELATED APPLICATION

The present application claims priority from provisional application Ser. No. 61/050,682, filed May 6, 2008, the contents of which are incorporated herein by reference in their entirety.

BACKGROUND

The present disclosure relates generally to optical waveguides and methods of making the same.

Since the inception of microelectronics, a consistent trend has been toward the development of passive and active optoelectronic devices. This may be due, at least in part, to the fact that optoelectronic devices may offer advantages over typical electronic devices, such as, for example, a much larger bandwidth (by many orders of magnitude). Such optoelectronic devices often involve the transmission of optical signals, and the interconversion of such optical signals into electronic signals.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

FIG. 1B is a schematic profile of the optical waveguide;

FIGS. 2A through 2K together illustrate a schematic flow diagram of the etch sequence used to form the optical waveguide of FIG. 1B;

FIG. 2L is a schematic profile of the optical waveguide of FIGS. 1B and 2K after it is fully oxidized.

DETAILED DESCRIPTION

Embodiments of the optical waveguide disclosed herein are formed of bare silicon wafers. The silicon optical waveguides are thermally well connected to the underlying bulk silicon, which enables efficient cooling of the device. It is further believed that this renders the waveguides less likely to suffer from temperature fluctuations that are typical of devices formed on silicon-on-insulator wafers, where the oxide layer acts as a thermal barrier and may deleteriously affect heat dissipation. Furthermore, the optical waveguides disclosed herein may advantageously be used in passive or active silicon optoelectronic devices.

Figures 1A, 1B:
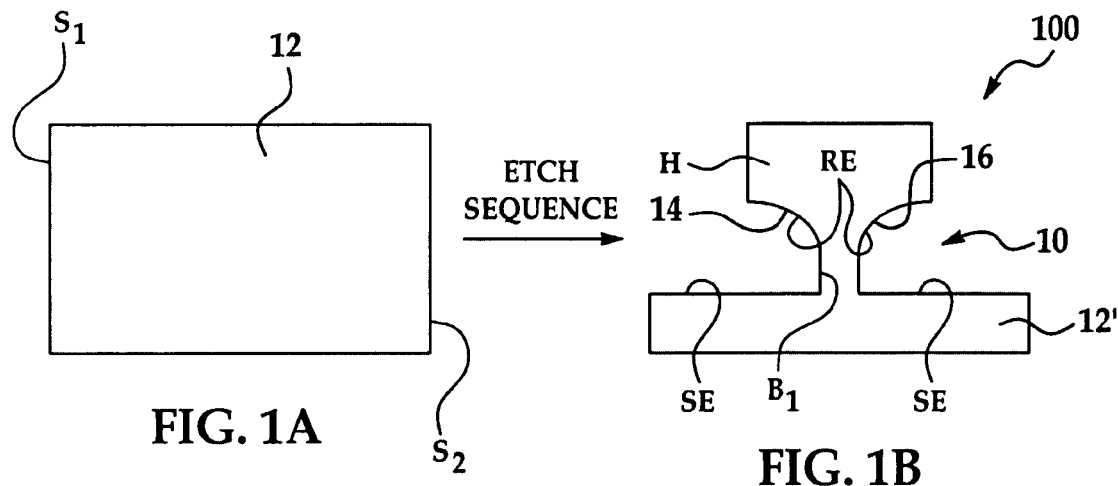
FIGS. 1A and 1B together illustrate a schematic flow diagram of the formation of an embodiment of an optical waveguide, where

Referring now to FIGS. 1A and 1B, a structure 100 including an optical waveguide 10 (the profile of which is shown in FIG. 1B) is formed from a bare silicon wafer 12 having two opposed sides $S_1$, $S_2$ (shown in FIG. 1A). The optical waveguide 10 is defined in the silicon wafer 12 such that the resulting structure 100 includes the waveguide 10 established on a remaining portion 12' of the original silicon wafer 12.

A sequence of isotropic and anisotropic etches are used to form notches 14, 16 in each of the two opposed sides $S_1$, $S_2$. A non-limiting example of the etch sequence is a single Bosch etch sequence. The etch sequence is discussed further hereinbelow in reference to FIGS. 2A through 2L.

The notches 14, 16 are configured such that the resulting waveguide 10 includes a head portion H and a first bottleneck or stem portion $B_1$. The elements H, $B_1$ of the waveguide 10 are established on a portion 12' of the silicon wafer 12. As depicted in FIG. 1B, each notch 14, 16 undercuts the head portion H, and includes a rounded edge RE and a straight edge SE. The rounded edges RE define the stem portion $B_1$ of the waveguide 10 and the straight edges SE are also respective surfaces of the silicon wafer portion 12'. The head portion H generally has a cross-sectional shape that is square, rectangular, elliptical, rounded or any other desirable geometry, with the bottomside rounding off and leading into the first stem portion $B_1$. It is believed that the stem portion $B_1$ provides an optical barrier that enables mode confinement in the head portion H. In one embodiment, the transverse electric (TE) mode of the waveguide 10 is substantially confined within the head portion H.

It is to be understood that the first stem portion $B_1$ may be partially or fully oxidized. Such oxidation may be accomplished in a standard oxidation furnace. The time of heating may be altered depending on whether partial or full oxidation is desired. It is believed that such oxidation enhances the optical isolation between the waveguide 10 and the underlying silicon wafer portion 12', while still enabling the first stem portion $B_1$ to provide adequate structural support to the waveguide 10.

FIGS. 2A through 2K illustrate a non-limiting example of the etch sequence used to form the embodiment of the structure 100 shown in FIG. 1B and in FIG. 2K. It is to be understood that such a sequence may also be used to form the embodiment of the structure 100' shown in FIG. 3.

As depicted in FIG. 2A, the silicon wafer 12 has an oxide layer 26 and a resist layer 28 established thereon. The oxide layer 26 may be established via any suitable growth or deposition technique. A thermal oxide insulator layer may be formed by the oxidation of silicon, which forms silicon dioxide. The oxide layer 26 may also be established via any conformal deposition technique, non-limiting examples of which include, but are not limited to low-pressure chemical vapor deposition (LPCVD), plasma enhanced chemical vapor deposition (PECVD), atmospheric pressure chemical vapor deposition (APCVD), or any other suitable chemical or physical vapor deposition techniques. The resist layer 28 may also be established on the oxide layer 26 via any suitable chemical or physical vapor deposition techniques.

Figure 3:
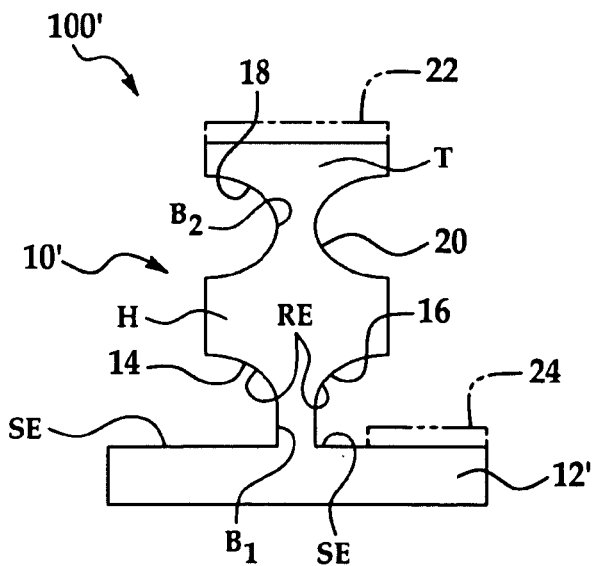
FIG. 3 is a schematic profile of another embodiment of an optical waveguide.

Electron beam (e-beam) or photo lithography is then used to pattern the resist layer 28 and to expose a portion of the oxide layer 26, as shown in FIG. 2B. It is to be understood that the pattern is ultimately used to form the head portion H (or top portion T if the embodiment of FIG. 3 is formed) of the structure 100 (or 100').

As shown in FIG. 2C, a metal layer 30 is established on the remaining portions of the resist layer 28 and the newly exposed portions of the oxide layer 26. Non-limiting examples of the metal layer 30 include aluminum, titanium, chromium or other like metals. Such a layer 30 may be deposited via sputtering, chemical vapor deposition (CVD), atomic layer deposition (ALD), evaporation (e.g. thermal or e-beam), inkjet deposition, and/or spin-coating.

Lift-off may then be used to remove the portions of the metal layer 30 that are established on the remaining resist layer 28, thereby exposing other portions of the oxide layer 26. It is to be understood that after lift-off, the portion of the metal layer 30 that is established directly on the oxide layer 26 remains. A dry etching process (e.g., $CF_4$) may then be used to remove these exposed oxide layer 26 portions. These processes are respectively depicted in FIGS. 2D and 2E. As shown in FIG. 2E, once the exposed oxide layer 26 portions are removed, portions of the silicon wafer 12 are exposed.

An anisotropic etching process (e.g., using HBr) may then be performed to remove a desirable amount of the exposed portions of the silicon wafer 12. This is depicted in FIG. 2F. As shown, the remaining metal and oxide layers 30, 26 act as a mask during this etching process and thus the silicon wafer 12 underlying these layers 30, 26 remains substantially unetched.

FIG. 2G illustrates the deposition of another oxide layer 32 on substantially the entire structure. Generally, this layer 32 is conformally deposited on the exposed surfaces of the silicon wafer 12 that are adjacent to the oxide layer 26, and the metal layer 30 via plasma enhanced chemical vapor deposition (PECVD). FIG. 2H illustrates the result of a dry etching process performed on the oxide layer 32. It is to be understood that the oxide layer 32 established on the sidewalls of the oxide layer 26, the metal layer 30 and the portions of the silicon wafer 12 exposed in FIG. 2F remains intact after the dry etch. This etching process exposes surfaces of the silicon oxide wafer 12 and the metal layer 30 as depicted in FIG. 2H.

Another anisotropic dry etching process is performed on the silicon wafer 12, as depicted in FIG. 2I. The remaining oxide layer 32 acts as a mask, and the silicon wafer 12 underlying this layer 32 remains unetched. It is to be understood that the etching process may be performed until a desirable height for the waveguide 10 is achieved, and a portion 12' of the silicon wafer 12 remains. As previously described, this portion 12' of the silicon wafer 12 acts as the support for the ultimately formed waveguide 10 (non-limiting examples of which are shown in FIGS. 2K and 2L).

An isotropic dry etching process is then performed on the silicon wafer 12 to form the notches 12, 14. $SF_6$ may be used in the isotropic dry etching process. The etching process may be controlled to undercut the silicon wafer 12 at an area where the oxide layer 32 abuts the wafer 12. As previously mentioned, the resulting undercuts form the notches 12, 14, thereby defining the first stem portion $B_1$.

It is to be understood that the process may vary somewhat when forming the structure 100' (shown in FIG. 3), which includes additional notches 18, 20. For example, the anisotropic and isotropic etching processes shown in FIGS. 2H through 2J may be altered so that a top portion T and a head portion H are formed with notches 18, 20 formed therebetween.

It is to be understood that the aspect ratio of the waveguide 10 may be controlled by changing the relative duration of anisotropic (e.g., HBr) and isotropic (e.g., $SF_6$) silicon etches.

FIG. 2K illustrates the removal of the remaining oxide layers 26, 32 and the resulting structure 100, which includes waveguide 10. The oxide may be removed, for example, via an HF dipping process.

FIG. 2L illustrates the structure 100 having waveguide fully oxidized. An additional oxide deposition process may be performed to conformally establish oxide on each of the surfaces of the waveguide 10.

Referring now to FIG. 3, another embodiment of the structure 100' includes another embodiment of the optical waveguide 10'. The method for forming such a structure 100' includes defining second notches 18, 20 in each of the two opposed sides $S_1$, $S_2$ during the anisotropic and isotropic etching processes. The second notches 18, 20 are generally formed a spaced distance from the respective first notches 14, 16. In an embodiment, the first notches 12, 14 are separated from the second notches 18, 20 via the head portion H.

Each of the second notches 18, 20 has a substantially rounded edge, and together the notches 18, 20 define a second stem $B_2$ of the optical waveguide 10'. It is believed that together the first and second stem portions $B_1$, $B_2$ provide optical barriers that enable mode confinement in the head portion H.

When the optical waveguide 10' includes the second stem $B_2$, it is to be understood that the etching processes may be performed such that a top portion T of the silicon wafer 12 is adjacent to the second stem $B_2$. A first electrical contact 22 may be operatively connected to the top portion T. In some embodiments, a second electrical contact 24 may be operatively connected to the silicon wafer portion 12', a non-limiting example of which is depicted in FIG. 2. Non-limiting examples of the first and second electrical contacts 22, 24 include metals (e.g., aluminum).

It is to be understood that high quality (Ohmic) contacts 22, 24 are made of metal and are established on a highly doped semi-conductor material. As such, the top portion T and the area of the portion 12' adjacent to the respective electrical contacts 22, 24 may be doped to exhibit a desirable conductivity. In one embodiment, the top portion T is doped p-type or n-type and the area of the portion 12' adjacent to the electrical contact 24 is doped the other of n-type or p-type. Dopants for introducing p-type conductivity include, but are not limited to boron, other like elements, or combinations thereof; and dopants for introducing n-type conductivity include, but are not limited to phosphorus, arsenic, antimony, other like elements, or combinations thereof.

It is to be understood that in some instances, the electrical contacts 22, 24 enable current to be easily introduced into and flown through the structure 100', and in other instances, the electrical contacts 22, 24 enable charges to be easily extracted from the structure 100'. The function of the contacts 22, 24 depends, at least in part, on whether the structure 100' is used in a modulator or a detector device.

It is to be understood that one or both of the first and second stem portions $B_1$, $B_2$ may be partially or fully oxidized. It is believed that such oxidation enhances the optical isolation of the waveguide 10'.

The dimensions of the head portion H and stem portion(s) $B_1$, $B_2$ depend, at least in part, on the wavelength used, and on whether the waveguide 10, 10' is single-mode or multi-mode. In a non-limiting example, the height and width of the waveguide 10, 10' each ranges from about 100 nm to about 1000 nm.

In one embodiment of the optical waveguide 10' including both stem portions $B_1$, $B_2$, electronic components (CMOS) and optical components may advantageously be integrated into the same structure. The electronic components may be operatively positioned, for example, on the top portion P and may be isolated with an oxide layer. The optical components may be placed adjacent to the silicon substrate portion 12' such that they are located at an end of the structure opposite to the end at which the electrical components are located. The electrical and optical components may be operatively connected using through silicon vias.

While several embodiments have been described in detail, it will be apparent to those skilled in the art that the disclosed embodiments may be modified. Therefore, the foregoing description is to be considered exemplary rather than limiting.

What is claimed is:

1. An optical waveguide, comprising:
a silicon wafer having two opposed sides; and
a first notch defined in each of the two opposed sides such that the silicon wafer includes a head portion, a first stem portion, and a support, and such that each of the first notches undercuts the head portion and includes a rounded edge and a straight edge, where the rounded edges define the first stem portion, and the straight edges are respective surfaces of the support.

2. The optical waveguide as defined in claim 1, further comprising a second notch defined in each of the two opposed sides a spaced distance from the respective first notches.

3. The optical waveguide as defined in claim 2 wherein each second notch includes a rounded edge.

4. The optical waveguide as defined in claim 2 wherein the silicon wafer further includes a second stem portion defined by the second notches.

5. The optical waveguide as defined in claim 4 wherein at least one of the first stem portion or the second stem portion is partially or fully oxidized.

6. The optical waveguide as defined in claim 4, further comprising:
a top portion of the silicon wafer adjacent the second stem portion; and
an electrical contact operatively connected to the top portion.

7. The optical waveguide as defined in claim 4, further comprising:
a doped top portion of the silicon wafer adjacent the second stem portion;
a first electrical contact operatively connected to the doped top portion;
a doped bottom portion of the silicon wafer adjacent the first stem portion; and
a second electrical contact operatively connected to the doped bottom portion.

8. The optical waveguide as defined in claim 7 wherein the top portion is doped to have one of p-type conductivity or n-type conductivity and wherein the bottom portion is doped to have an other of n-type conductivity or p-type conductivity.

9. The optical waveguide as defined in claim 1 wherein a transverse electric mode of the optical waveguide is substantially confined in the head portion.

10. The optical waveguide as defined in claim 1 wherein the first stem portion is partially or fully oxidized.

11. A method of making an optical waveguide, comprising:
sequentially anisotropically and isotropically etching two opposed sides of a silicon wafer, thereby forming a first notch in each of the two opposed sides and defining a head portion and a first stem portion of the silicon wafer.

12. The method as defined in claim 11, further comprising forming a second notch in each of the two opposed sides a spaced distance from the respective first notches during the sequential isotropic and anisotropic etching processes.

13. The method as defined in claim 12 wherein the second notches define a second stem portion of the silicon wafer, and wherein the method further comprises partially or fully oxidizing at least one of the first stem portion or the second stem portion.

14. The method as defined in claim 13, further comprising:
defining a top portion of the silicon wafer adjacent the second stem portion; and
operatively connecting an electrical contact to the top portion.

15. The method as defined in claim 14, further comprising:
doping the top portion;
doping a bottom portion of the silicon wafer that is adjacent the first stem portion; and
operatively connecting a second electrical contact to the doped bottom portion.

16. A method of making an optical waveguide, comprising:
patterning a resist layer to expose a portion of an underlying oxide layer, where the oxide layer is established on a silicon wafer;
depositing a metal layer on the exposed portion of the oxide layer and remaining portions of the resist layer;
removing i) portions of the metal layer established on the remaining portions of the resist layer and ii) the remaining portions of the resist layer, thereby exposing other portions of the oxide layer;
removing the other exposed portions of the oxide layer to form a structure including a remaining portion of the metal layer on a remaining portion of the oxide layer;
anisotropically etching the silicon wafer such that a portion of the silicon wafer underlying the structure is unetched and silicon wafer sidewalls adjacent to the structure are exposed;
establishing an other oxide layer at least on the exposed silicon wafer sidewalls;
anisotropically dry etching the silicon wafer such that an other portion of the silicon wafer underlying the structure and the other oxide layer is unetched and a support is formed in the silicon wafer;
isotropically etching the silicon wafer between the support and the other oxide layer to form notches on opposed sides of the silicon wafer such that each notch undercuts the silicon wafer at an area where the other oxide layer abuts the silicon wafer, thereby forming a head portion and a first stem portion in the silicon wafer, where the first stem portion connects the head portion to the support; and
removing the remaining portion of the metal layer.

17. The method as defined in claim 16, further comprising removing the remaining portion of the oxide layer and the other oxide layer.

* * * * *

UNITED STATES PATENT AND TRADEMARK OFFICE
CERTIFICATE OF CORRECTION

| | | |
|---|---|---|
| PATENT NO. | : 7,907,811 B2 | Page 1 of 1 |
| APPLICATION NO. | : 12/263400 | |
| DATED | : March 15, 2011 | |
| INVENTOR(S) | : Fattal et al. | |

It is certified that error appears in the above-identified patent and that said Letters Patent is hereby corrected as shown below:

On the Title page, in Item (75), Inventors, in column 1, line 2, delete "Florentino" and insert
-- Fiorentino --, therefor.

Signed and Sealed this
Fourteenth Day of June, 2011

David J. Kappos
*Director of the United States Patent and Trademark Office*